US008459788B2

(12) United States Patent
Chretien et al.

(10) Patent No.: US 8,459,788 B2
(45) Date of Patent: Jun. 11, 2013

(54) CURABLE SOLID INK COMPOSITIONS COMPRISING NOVEL CURABLE WAX (75) Inventors: Michelle N. Chretien, Mississauga (CA); Naveen Chopra, Oakville (CA); Barkev Keoshkerian, Thornhill (CA); Bryan J. Roof, Newark, NY (US)

(73) Assignee: Xerox Corporation, Norwalk, CT (US)

( * ) Notice: Subject to any disclaimer, the term of this patent is extended or adjusted under 35 U.S.C. 154(b) by 199 days.

(21) Appl. No.: 13/041,144

(22) Filed: Mar. 4, 2011

(65) Prior Publication Data
US 2012/0224011 A1 Sep. 6, 2012

(51) Int. Cl.
C09D 11/00 (2006.01)

(52) U.S. Cl.
USPC ............................................. 347/100

(58) Field of Classification Search
USPC ............................................. 347/100
See application file for complete search history.

(56) References Cited

U.S. PATENT DOCUMENTS

| 5,195,430 | A | 3/1993 | Rise |
| 5,221,335 | A | 6/1993 | Williams et al. |
| 5,231,135 | A | 7/1993 | Machell et al. |
| 5,621,022 | A | 4/1997 | Jaeger et al. |
| 6,221,137 | B1 | 4/2001 | King et al. |
| 6,472,523 | B1 | 10/2002 | Banning et al. |
| 6,476,219 | B1 | 11/2002 | Duff et al. |
| 6,576,747 | B1 | 6/2003 | Carlini et al. |
| 6,576,748 | B1 | 6/2003 | Carlini et al. |
| 6,590,082 | B1 | 7/2003 | Banning et al. |
| 6,646,111 | B1 | 11/2003 | Carlini et al. |
| 6,663,703 | B1 | 12/2003 | Wu et al. |
| 6,673,139 | B1 | 1/2004 | Wu et al. |
| 6,696,552 | B2 | 2/2004 | Mayo et al. |
| 6,713,614 | B2 | 3/2004 | Carlini et al. |
| 6,726,755 | B2 | 4/2004 | Titterington et al. |
| 6,755,902 | B2 | 6/2004 | Banning et al. |
| 6,821,327 | B2 | 11/2004 | Jaeger et al. |
| 6,958,406 | B2 | 10/2005 | Banning et al. |
| 7,053,227 | B2 | 5/2006 | Jaeger et al. |
| 7,276,614 | B2 | 10/2007 | Toma et al. |
| 7,279,587 | B2 | 10/2007 | Odell et al. |
| 7,381,831 | B1 | 6/2008 | Banning et al. |
| 7,427,323 | B1 | 9/2008 | Birau et al. |
| 2007/0120910 | A1 | 5/2007 | Odell et al. |
| 2007/0142492 | A1* | 6/2007 | Odell et al. ............... 522/74 |
| 2008/0000384 | A1* | 1/2008 | Belelie et al. ............ 106/31.13 |
| 2008/0122914 | A1 | 5/2008 | Toma et al. |
| 2009/0082489 | A1* | 3/2009 | Breton et al. ............. 523/200 |
| 2009/0136681 | A1* | 5/2009 | Belelie et al. ............ 427/532 |
| 2010/0021698 | A1 | 1/2010 | Chretien et al. |
| 2010/0112232 | A1 | 5/2010 | Chretien et al. |
| 2010/0304040 | A1 | 12/2010 | Chretien et al. |

OTHER PUBLICATIONS

U.S. Appl. No. 12/765,148, filed Apr. 22, 2010, Chopra et al.

* cited by examiner

*Primary Examiner* — Laura Martin
(74) *Attorney, Agent, or Firm* — Pillsbury Winthrop Shaw Pittman LLP (57) ABSTRACT Curable solid ink compositions, which include a curable wax having a melting point under 40° C. as part of the ink vehicle, and are suitable for ink jet printing in applications that require high and/or variable levels of gloss. In particular, there is provided a novel high gloss, ultraviolet (UV) curable, phase change ink composition that includes a colorant and an ink vehicle that further includes a gellant, a reactive diluent, a photoinitiator package, and a curable acrylate wax.

19 Claims, 4 Drawing Sheets

CURABLE SOLID INK COMPOSITIONS COMPRISING NOVEL CURABLE WAX

BACKGROUND

The present embodiments relate to curable phase-change ink compositions characterized by being solid at room temperature and molten at an elevated temperature at which the molten ink is applied to a substrate. These solid ink compositions, generally comprising an ink vehicle and a colorant, can be used for ink jet printing. The present embodiments are directed to a novel high gloss, ultraviolet (UV) curable, phase change ink composition comprising a colorant and an ink vehicle comprising a gellant, a reactive diluent, e.g., monomer or co-monomer, a photoinitiator package, and a curable wax.

Ink jet printing processes may employ inks that are solid at room temperature and liquid at elevated temperatures. Such inks may be referred to as solid inks, hot melt inks, phase change inks and the like. In ink jet printing processes employing hot melt inks, the solid ink is melted by the heater in the printing apparatus and utilized (jetted) as a liquid in a manner similar to that of conventional ink jet printing. Upon contact with the printing recording medium, the molten ink solidifies rapidly, allowing the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, reduced print-through, and enablement of indefinite periods of nonprinting without the danger of nozzle clogging, even without capping the nozzles.

In general, phase change inks (sometimes referred to as "hot melt inks") are in the solid phase at room or ambient temperature, but exist in the liquid phase at the elevated operating temperature of an ink jet printing device. At the jet operating temperature, droplets of liquid ink are ejected from the printing device and, when the ink droplets contact the surface of the recording medium, the droplets quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

Radiation curable phase change inks generally comprise at least one curable monomer, a gellant, a colorant, and a radiation activated initiator, specifically a photoinitiator, that initiates polymerization of curable components of the ink, specifically of the curable monomer. U.S. Pat. No. 7,279,587 to Odell et al., the disclosure of which is totally incorporated herein by reference, discloses photoinitiating compounds useful in curable phase change ink compositions. U.S. Patent Publication 2007/0120910 to Odell et al., which is hereby incorporated by reference herein in its entirety, describes, in embodiments, a phase change ink comprising a colorant, an initiator, and an ink vehicle.

While the above conventional phase change solid ink technology is generally successful in producing vivid images and providing economy of jet use and substrate latitude on different substrates, such technology has not been satisfactory for applications requiring high gloss levels.

For example, U.S. Patent Publication Nos. 2010/0112232 and 2010/0227075, both to Belelie et al., disclose methods for producing images that are meant more for matte prints than high gloss prints, and U.S. Patent Publication Nos. 2010/0021698 and 2010/0112232, both to Chretien et al., disclose methods for varying gloss from print-to-print but such variation is not readily achieved within the same print. In addition, currently available UV curable, phase change inks have a certain level of substrate-matching ability with respect to gloss but cannot achieve the higher levels to be considered high gloss. Applications such as photo publishing, packaging requiring both glossy and matte finishes, and the like, require high and/or variable gloss levels. These applications are experiencing tremendous growth and, as such, there is a need to overcome the deficiencies of current phase change ink technology for use in such applications. While known compositions and processes are suitable for their intended purposes, a need remains for excellent robust quality inks with high and/or varying gloss levels.

Each of the foregoing U.S. Patents and Patent Publications are incorporated by reference herein. Further, the appropriate components and process aspects of the each of the foregoing U.S. Patents and Patent Publications may be selected for the present disclosure in embodiments thereof.

SUMMARY

According to embodiments illustrated herein, there is provided a novel curable solid ink composition comprising a curable wax having a melting point that is lower than 40° C., specifically, between 25 and 40° C., as part of the ink vehicle, which are suitable for ink jet printing in applications that require high and/or variable levels of gloss.

In particular, the present embodiments provide a curable phase change ink comprising: an ink vehicle further comprising a curable wax which comprises one or more acrylates having a formula of:

wherein n is less than 22 and has a melting point between 25 and 40° C.; and an optional colorant.

In further embodiments, there is provided a curable phase change ink comprising: a colorant; and an ink vehicle further comprising a curable wax which comprises one or more acrylates having a formula of:

wherein n is from 16 to 22 and has a melting point between 25 and 40° C., and further wherein when the curable phase change ink is printed and cured on a substrate.

In yet other embodiments, there is provided a method for forming an image, said method comprising: applying the curable phase change ink described above to a substrate in an imagewise manner; and exposing the curable phase change ink to radiation to cure the ink.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

Curable phase change ink technology broadens printing capability and customer base across many markets, and the diversity of printing applications will be facilitated by effective integration of printhead technology, print process and ink materials. The phase change ink compositions are characterized by being solid at room temperature and molten at an elevated temperature at which the molten ink is applied to a substrate. As discussed above, while current ink options are successful for printing on various substrates and providing enhanced robustness these options are not always satisfactory for certain applications requiring high or varying levels of gloss.

The present embodiments provide a novel formulation for high gloss ultraviolet (UV) curable, phase change inks for use in ink jet printing, and specifically, production ink jet printing. Radiation curable phase change inks generally comprise an ink vehicle comprising at least a curable monomer, a curable wax, a gellant, and a radiation activated initiator, specifically a photoinitiator, that initiates polymerization of curable components of the ink (specifically of the curable monomer), and optionally a colorant.

In the present embodiments, the novel phase change ink composition comprises a curable wax having a melting point of from about 40 to about 25° C., or between 25 and 40° C., or from about 25 to about 35° C., or from about 30 to about 35° C. This formulation provides a significant enhancement to previous phase change inks by allowing for direct printing of high gloss images without overcoating.

In embodiments, the high gloss ink composition is obtained by using a curable acrylate as a wax in the ink vehicle, that has both a lower melting temperature and a sharper melting transition than the acrylate wax commonly used (e.g., Unilin 350-acrylate) which has a melting point closer to the jetting temperature of from about 85 to about 90° C. Suitable acrylates may be selected from the group consisting of C18 acrylate, C20 acrylate, C22 acrylate, and mixtures thereof in any combination. In general embodiments, suitable acrylates comprise any combination of acrylates having a chain length of C22 or less so long as the melting point of the wax mixture is below 40° C. For example, the acrylate may have the following formula:

wherein n is less than 22, or from about 22 to about 16, or from about 22 to about 18. In specific embodiments, suitable acrylates comprise a combination of from about 40 to about 55 weight percent of C18 acrylate, from about 0 to about 15 weight percent C20 acrylate and from about 35 to about 45 weight percent C22 acrylate.

In further embodiments, the variable gloss ink composition is obtained by using the high gloss ink composition described above and a medium or low gloss ink to tune gloss within a print. For example, the variable gloss may be achieved by jetting the low and high gloss inks or medium and high gloss inks separately in halftone patterns or by mixing inks of differing gloss levels. Thus, this formulation provides a significant enhancement to previous phase change inks by allowing for direct printing of high gloss images without overcoating as well as providing for a way to achieve truly digital, variable gloss.

The curable wax is present in the ink composition in an amount of from about 15 percent to about 1 percent by weight, or from about 15 percent to about 5 percent by weight, or from about 10 percent to about 5 percent by weight of the total weight of the ink composition, although the amounts can be outside of these ranges. Prints made with this novel high gloss ink composition show a substantially higher gloss, an increase of about 50 to about 60 GU (75 degrees) as compared to the standard ink as measured with a BYK TriGloss glossmeter. In addition, rheology measurements show that the viscosity at room temperature and jetting temperature are essentially the same as the standard ink.

Following jetting, the composition may then be exposed to curing energy for curing of the composition. The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light from any appropriate source such a light-emitting diode (LED), mercury acr lamp, xenon lamp, and the like, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof. The viscosity of the ink composition further increases upon exposure to the suitable source of curing energy, such that it hardens to a solid; the viscosity of the cured ink composition is not routinely measurable.

In further embodiments, the reactive diluent, a monomer, co-monomer and/or oligomer may be present in the ink in an amount of, for example, about 10 to about 90% by weight of the ink, such as about 20 to about 80% by weight of the ink, or about 50 to about 70% by weight of the total ink composition although the amounts can be outside of these ranges. In specific embodiments the ink can include the gelling agent, or gellant, in any suitable amount, such as about 1% to about 30% by weight of the ink, for example in an amount of about 2% to about 20% by weight of the ink, such as about 5% to about 12% by weight of the total ink composition, although the amounts can be outside of these ranges. In specific embodiments, the radiation activated initiator may be, for example, about 0.5 to about 15%, such as about 1 to about 12%, or about 2 to about 10% by weight of the total weight of the ink composition, although the amounts can be outside of these ranges. In the present embodiments, the colorant may be a pigment or dye and may be included in the ink in any suitable amount, such as an amount of from about 0.1 to about 25% by weight of the ink, such as about 0.5 or about 20% to about 1 or about 15% by weight of the total weight of the ink composition, although the amounts can be outside of these ranges. In a specific embodiment, the colorant is a pigment dispersion. In such embodiments, the pigment dispersion comprises a suitable pigment selected from the list below in combination with any suitable dispersant.

Curable Monomers

In embodiments, the curable phase change ink includes an ink vehicle comprised of at least a gellant, at least a curable wax, an optional photoinitiator, an optional colorant, and at least a curable monomer. In embodiments, if more than one curable liquid monomer is present in the curable phase change ink, the curable liquid monomers are referred to "co-monomers". The co-monomers may be chosen from any suitable curable monomers.

Ink compositions of embodiments may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the at least one curable monomer of the composition include propoxylated neopentyl glycol diacrylate (such as SR9003 from Sartomer), diethylene glycol diacrylate, triethylene glycol diacrylate, butanediol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, tricyclodecane dimethanol diacrylate, dioxane glycol diacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris (2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR399LV and SR 494), and the like.

Additional examples of the curable monomers include acrylated esters, acrylated polyesters, acrylated ethers, acrylated polyethers, acrylated epoxies, urethane acrylates, and pentaerythritol tetraacrylate. Specific examples of suitable acrylated oligomers include, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like; acrylated urethane oligomers, such as EB270 (UCB Chemicals), EB 5129 (Cytec Surface Specialties), CN2920 (Sartomer Co.), CN3211 (Sartomer Co.), and the like; and acrylated epoxy oligomers, such as EB 600 (Cytec Surface Specialties), EB 3411 (Cytec Surface Specialties), CN2204 (Sartomer Co.), CN110 (Sartomer Co.), and the like.

In embodiments, the curable monomer may be chosen from short-chain alkyl glycol diacrylates or ether diacrylates or from acrylates having short-chain alkyl ester substituents, such as caprolactone acrylate, and the commercially available products CD536, CD 2777, CD585 and CD586 (available from Sartomer Co. Inc.).

In addition, the curable monomer or oligomer may variously function as a viscosity reducer, as a binder when the composition is cured, as an adhesion promoter, as a reactive diluent and as a crosslinking agent that can increase the crosslink density of the cured image, thereby enhancing the toughness of the cured images. Suitable monomers may have a low molecular weight, low viscosity, and low surface tension and comprise functional groups that undergo polymerization upon exposure to radiation such as UV light.

As mentioned above, the one or more monomers may be present in the ink in an amount of, for example, about 10 to about 90% by weight of the ink, such as about 20 to about 80% by weight of the ink, or about 50 to about 70% by weight of the total ink composition although the amounts can be outside of these ranges.

Curable Gellants

The curable phase change ink composition may include at least one gellant.

The organic gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink formulation. Mixtures of one or more gellants may be used to effect the phase change transition.

The phase change nature of the gellant can thus be used to cause a rapid viscosity increase in the jetted ink composition upon the substrate following jetting of the ink to the substrate. In particular, jetted ink droplets would be pinned into position on a receiving substrate, such as an image-receiving medium (for instance, paper), that is at a temperature cooler than the ink-jetting temperature of the ink composition through the action of a phase change transition in which the ink composition undergoes a significant viscosity change from a liquid state to a gel state (or semi-solid state).

In embodiments, the temperature at which the ink composition forms the gel state is any temperature below the jetting temperature of the ink composition, for example any temperature that is about 10° C. or more below the jetting temperature of the ink composition. There is a rapid and large increase in ink viscosity upon cooling from the jetting temperature at which the ink composition is in a liquid state, to the gel transition temperature, at which the ink composition converts to the gel state.

A suitable gellant for the ink composition would gel the monomers/oligomers in the ink vehicle quickly and reversibly, and demonstrate a narrow phase change transition, for example within a temperature range of about 10° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 60° C., compared to the viscosity at the jetting temperature. In particular embodiments, the gellant-containing ink compositions rapidly increase in viscosity within 5° C. to 10° C. below the jetting temperature and ultimately reach a viscosity above $10^4$ times the jetting viscosity, for example about $10^6$ times the jetting viscosity.

Gellants suitable for use in the ink compositions include a curable gellant comprised of a curable amide, a curable polyamide-epoxy acrylate component and a polyamide component, a curable composite gellant comprised of a curable epoxy resin and a polyamide resin, mixtures thereof and the like, as disclosed in U.S. Patent Publication No. 2010/0304040, which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference. Additional gellants suitable for use also include those described in U.S. patent application Ser. No. 12/765,148 to Chopra et al. filed on Apr. 22, 2010.

As described in U.S. Pat. No. 7,279,587, the amide gellant may be a compound of the formula wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about

1 carbon atom to about 8 carbon atoms or from about 1 carbon atom to about 5 carbon atoms,
(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms,
(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or
(iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms,
wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:
(i) alkylene groups having from about 1 carbon atom to about 54 carbon atoms, such as from about 1 carbon atom to about 48 carbon atoms or from about 1 carbon atom to about 36 carbon atoms,
(ii) arylene groups having from about 5 carbon atoms to about 15 carbon atoms, such as from about 5 carbon atoms to about 13 carbon atoms or from about 5 carbon atoms to about 10 carbon atoms,
(iii) arylalkylene groups having from about 6 carbon atoms to about 32 carbon atoms, such as from about 7 carbon atoms to about 33 carbon atoms or from about 8 carbon atoms to about 15 carbon atoms, or
(iv) alkylarylene groups having from about 6 carbon atoms to about 32 carbon atoms, such as from about 6 carbon atoms to about 22 carbon atoms or from about 7 carbon atoms to about 15 carbon atoms,
wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:
(a) photoinitiating groups, such as groups derived from 1-(4-(2-hydroxyethoxy)phenyl)-2-hydroxy-2-methylpropan-1-one, of the formula groups derived from 1-hydroxycyclohexylphenylketone, of the formula groups derived from 2-hydroxy-2-methyl-1-phenylpropan-1-one, of the formula groups derived from N,N-dimethylethanolamine or N,N-dimethylethylenediamine, of the formula or the like, or:
(b) a group which is:
(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring; and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or

(v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

In embodiments, the gellant may comprise a mixture comprising:

(I)

(II)

(III)

wherein —$C_{34}H_{56+a}$— represents a branched alkylene group which may include unsaturations and cyclic groups, wherein the variable "a" is an integer from 0-12.

In embodiments, the gellant may be one of the aromatic end-capped gellants described in U.S. patent application Ser. No. 12/765,148 to Chopra et al. filed on Apr. 22, 2010, which is hereby incorporated by reference in its entirety.

In embodiments, the gellants of the ink may be compounds with the following general structures or As mentioned above, the ink can include the gelling agent, or gellant, in any suitable amount, such as about 1% to about 30% by weight of the ink, for example in an amount of about 2% to about 20% by weight of the ink, such as about 5% to about 12% by weight of the total ink composition, although the amounts can be outside of these ranges.

As mentioned above, the ink can include the gelling agent, or gellant, in any suitable amount, such as about 1% to about 30% by weight of the ink, for example in an amount of about 2% to about 20% by weight of the ink, such as about 5% to about 12% by weight of the total ink composition, although the amounts can be outside of these ranges.

As stated above, the ink composition includes at least one curable wax comprising a curable acrylate. Inclusion of the wax may promote an increase in viscosity of the ink composition as the composition cools from the application temperature. Thus, the wax may also assist the gellant in avoiding bleeding of the composition through the substrate.

The curable wax may be any low-melt wax component that has a melting point between 25 and 40° C. that is miscible with the other components and that will polymerize with the curable monomer to form a polymer. The term wax includes, for example, any of the various natural, modified natural, and synthetic materials commonly referred to as waxes.

The curable wax can be included in the composition in an amount of from, for example, about 0.1% to about 30% by weight of the composition, such as from about 0.5% to about 20% or from about 0.5% to 15% by weight of the composition.

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from BASF); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, DI 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, the disclosures of each of which are incorporated herein by reference in their entirety.

The ink may also contain a pigment stabilizing surfactant or dispersant having portions or groups that have an excellent adsorption affinity for the various pigments used in the colored inks of the ink set, and also having portions or groups that allow for dispersion within the ink vehicle are desired. Selection of an appropriate dispersant for all of the colored inks of the ink set may require trial and error evaluation, capable by those of ordinary skill in the art, due to the unpredictable nature of dispersant/pigment combinations.

As example dispersants, random and block copolymers may be suitable. A particularly desirable block copolymer is an amino acrylate block copolymer, for example including an amino or amino acrylate block A and an acrylate block B, the acrylate portions permitting the dispersant to be stably and well dispersed in the ink vehicle while the amino portions adsorb well to pigment surfaces. Commercially available examples of block copolymer dispersants that have been found suitable for use herein are DISPERBYK-2001 (BYK Chemie GmbH) and EFKA 4340 (Ciba Specialty Chemicals).

The colorant may be included in the ink composition in an amount of from, for example, about 0.1 to about 15% by weight of the ink composition, such as about 2.0 to about 9% by weight of the ink composition.

Initiators

The curable phase change ink composition may optionally include an initiator, such as, for example, a photoinitiator. In embodiments, such an initiator is desirable for assisting in curing of the ink.

In embodiments, a photoinitiator that absorbs radiation, for example UV light radiation, to initiate curing of the curable components of the ink may be used. As the photoinitiator for ink compositions of embodiments that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-hydroxketones, α-alkoxyketones, α-aminoketones, α-alkoxyalkylphenones, α-aminoalkylphenones and acylphosphine photoinitiators sold under the trade designations of IRGACURE and DAROCUR from BASF. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as BASF IRGACURE 819) and other acyl phosphines; 2-methyl-1-(4-methylthio)phenyl-2-(4-morphorlinyl)-1-propanone (available as BASF IRGACURE 907) and 1-(4-(2-hydroxyethoxy) phenyl)-2-hydroxy-2-methylpropan-1-one (available as BASF IRGACURE 2959); 2-benzyl 2-dimethylamino 1-(4-morpholinophenyl) butanone-1 (available as BASF IRGACURE 369); 2-hydroxy-1-(4-(4-(2-hydroxy-2-methylpropionyl)-benzyl)-phenyl)-2-methylpropan-1-one (available as BASF IRGACURE 127); 2-dimethylamino-2-(4-methylbenzyl)-1-(4-morpholin-4-ylphenyl)-butanone-(available as BASF IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

In embodiments, the photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

Optional Additives

The ink vehicle of one or more inks of the ink set may contain additional optional additives. Optional additives may include surfactants, light stabilizers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, which are agents that create or reduce different gloss levels, opacifiers, antistatic agents, dispersants, and the like.

The inks may include, as a stabilizer, a radical scavenger, such as IRGASTAB UV 10 (BASF). The inks may also include an inhibitor, such as a hydroquinone or monomethylether hydroquinone (MEHQ), to stabilize the composition by prohibiting or, at least, delaying, polymerization of the oligomer and monomer components during storage, thus increasing the shelf life of the composition.

The ink may optionally contain antioxidants to protect the images from oxidation and also may protect the ink components from oxidation while existing as a heated melt in the ink reservoir. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARDT™ 1-403, and NALJGARD™ 959, commercially available from Crompton Corporation, Middlebury, Conn.; IRGANOX™ 1010, and IRGASTAB UV 10, commercially available from BASF; GENORAD 16 and GENORAD 40 commercially available from Rahn AG, Zurich, Switzerland, and the like. When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

The curable phase change inks are solid or solid-like at room temperature. It is desired for the curable phase change inks to have a viscosity of less than about 30 mPas, such as less than about 20 mPas, for example from about 3 to about 20 mPas, from about 5 to about 20 mPas or from about 8 to about 15 mPas, at the temperature of jetting of the ink. Thus, the inks are jetted in a liquid state, which is achieved by applying heat to melt the ink prior to jetting. The inks are desirably jetted at low temperatures, in particular at temperatures below about 120° C., for example from about 50° C. to about 110° C. or from about 60° C. to about 100° C. or from about 70° C. to about 90° C. The inks are thus ideally suited for use in piezoelectric ink jet devices.

When a gelling agent is used in the inks, the temperature at which the ink forms the gel state is any temperature below the jetting temperature of the ink, for example any temperature that is about 5° C. or more below the jetting temperature of the ink. In embodiments, the gel state may be formed at temperatures from about 25° C. to about 100° C., such as from about 40° C. to about 80° C. or from about 40° C. to about 65° C. There is a rapid and large increase in ink viscosity upon cooling from the jetting temperature, at which the ink is in a liquid state, to the gel temperature, at which the ink is in the gel state. The viscosity increase is, for example, about at least a $10^{2.5}$-fold increase in viscosity.

The ink compositions can be prepared by any desired or suitable method. For example, each of the components of the ink carrier can be mixed together, followed by heating, the mixture to at least its melting point, for example from about 60° C. to about 120° C., 80° C. to about 110° C., 85° C. to about 100° C. or about 85° C. to about 95° C. The colorant may be added before the ink ingredients have been heated or after the ink ingredients have been heated. The heated mixture is then stirred for about 5 seconds to about 10 minutes or more, to obtain a substantially homogeneous, uniform melt, followed by cooling the ink to ambient temperature (typically from about 20° C. to about 25° C.). The inks are gels at ambient temperature. The inks can be employed in apparatus for direct printing ink jet processes. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image. Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of the Curable Phase Change Ink

Figure 1A:
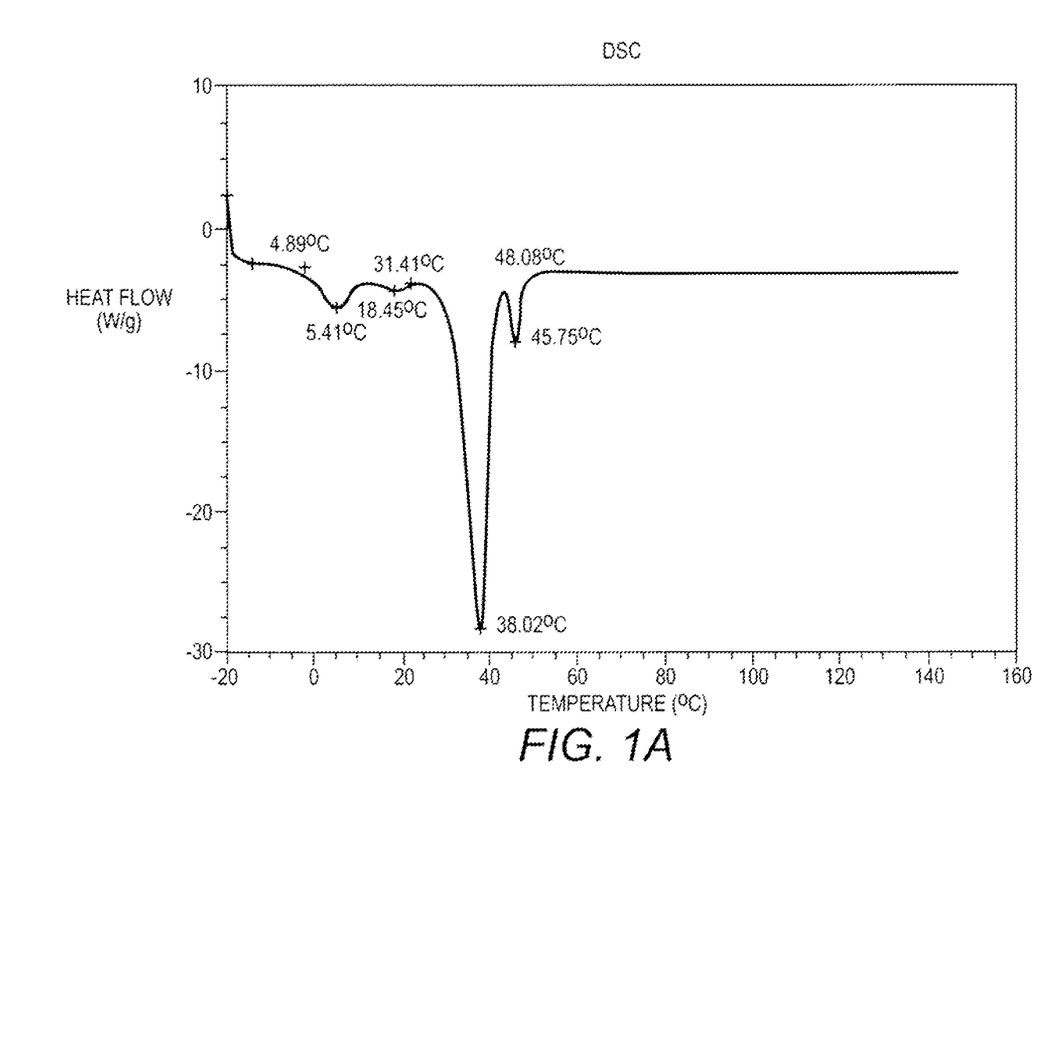
FIG. 1A is differential scanning calorimetry (DSC) data of a curable acrylate wax confirming melting properties according to the present embodiments.
Figure 1B:
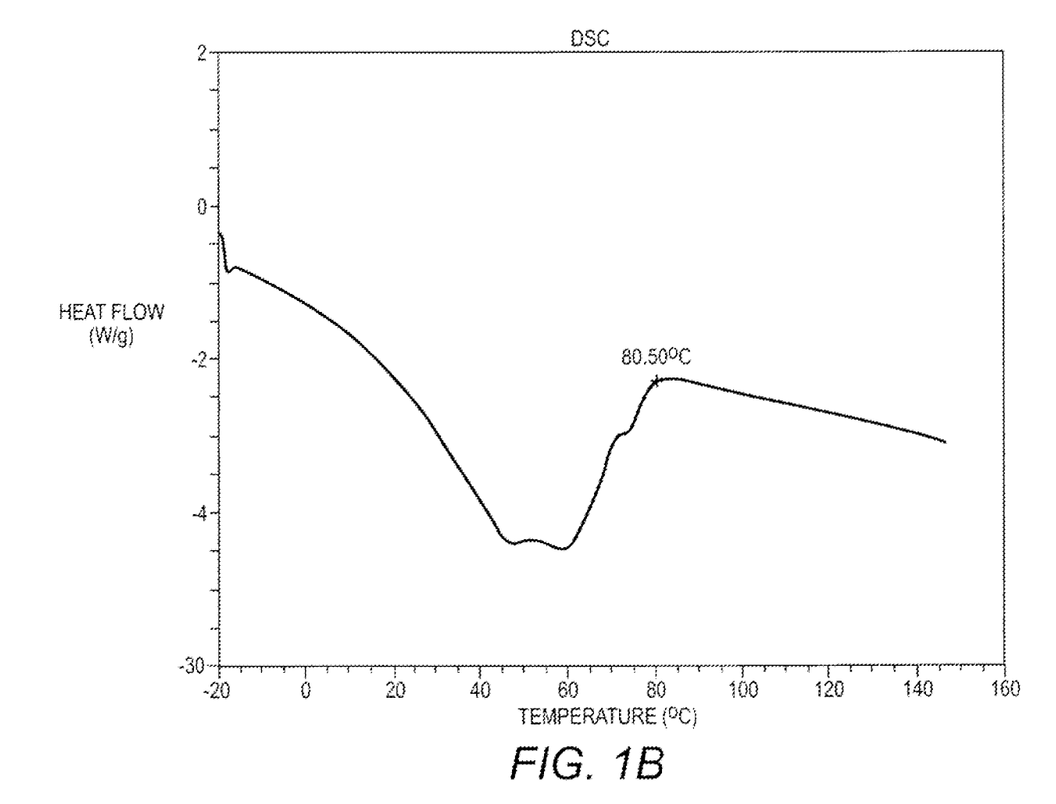
FIG. 1B is differential scanning calorimetry (DSC) data of a control curable wax confirming melting properties.

UV curable phase change inks with the compositions given in Table 1 below were prepared on a 250 g scale by homogenization at 13000 rpm and 85° C. for 1 to about 1.5 hours. The key difference between these inks is the curable wax component, in the case of the standard inks the curable wax was UNILIN-350 acrylate (melting point by DSC=82° C.) and in the case of the inventive embodiment, the standard wax component was replaced by AGEFLEX FA1822 (available from Ciba, Inc., Basel, Switzerland), a mixture of C18, C20, and C22 acrylates, which has a melting point of ~38° C. (as shown in FIG. 1A). Additionally, the DSC data below shows that the melting transition of the AGEFLEX wax (FIG. 1A) is much sharper than that for the UNILIN 350 based material (FIG. 1B).

TABLE 1

| Component | | Control (wt %) | Example 1 (wt %) |
|---|---|---|---|
| Gellant | Amide gellant | 7.5 | 7.5 |
| Wax | UNILIN 350 acrylate | 5 | — |
| Photoinitiator | IRGACURE 127 | 3.5 | 3.5 |
| Photoinitiator | IRGACURE 819 | 2 | 2 |
| Photoinitiator | IRGACURE 379 | 3 | 3 |
| Photoinitiator | IRGASTAB UV10 | 0.2 | 0.2 |
| Pigment dispersion | Cyan pigment dispersion | 20 | 20 |
| Wax | AGEFLEX FA-1822 | — | 5 |
| Reactive diluent | SR9003 (propoxylated neopentyl glycol diacrylate) | 58.8 | 58.8 |
| Total | | 100 | 100 |

Test Results

Figure 2:
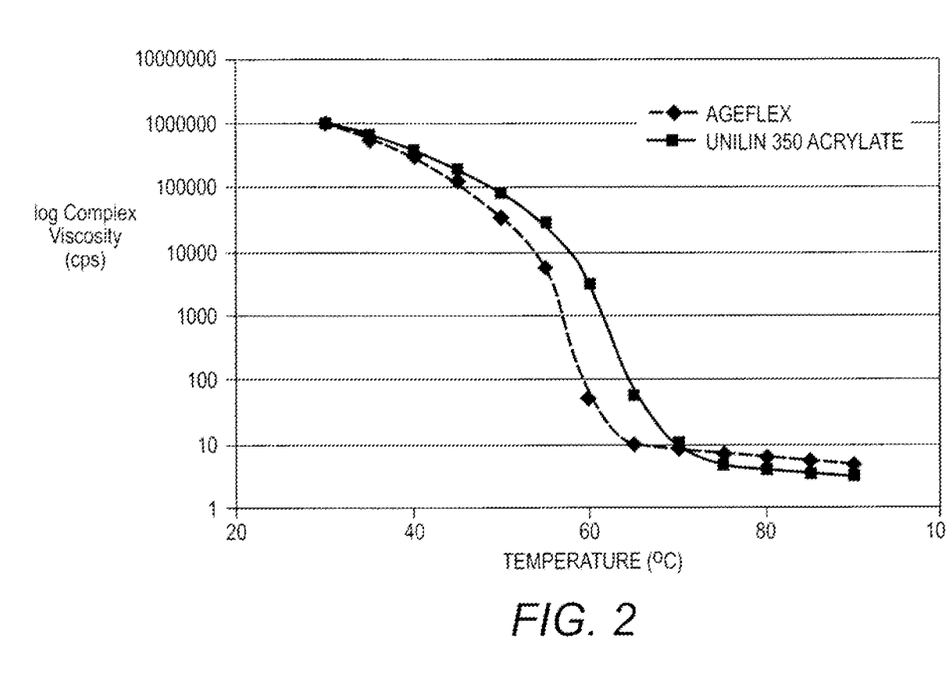
FIG. 2 is a graph illustrating rheology data of a curable phase change ink containing the low-melting curable acrylate wax of the present disclosure as compared to a curable phase change ink containing high melting control curable wax according to the present embodiments.

The resulting inks displayed favorable rheology, having viscosities below 10 cps at jetting temperature and viscosities of $10^6$ cps at room temperature. The dynamic temperature step data recorded using an RFS3 controlled strain rheometer from TA Instruments equipped with a 50 mm parallel plate is shown below in FIG. 2.

Figure 3:
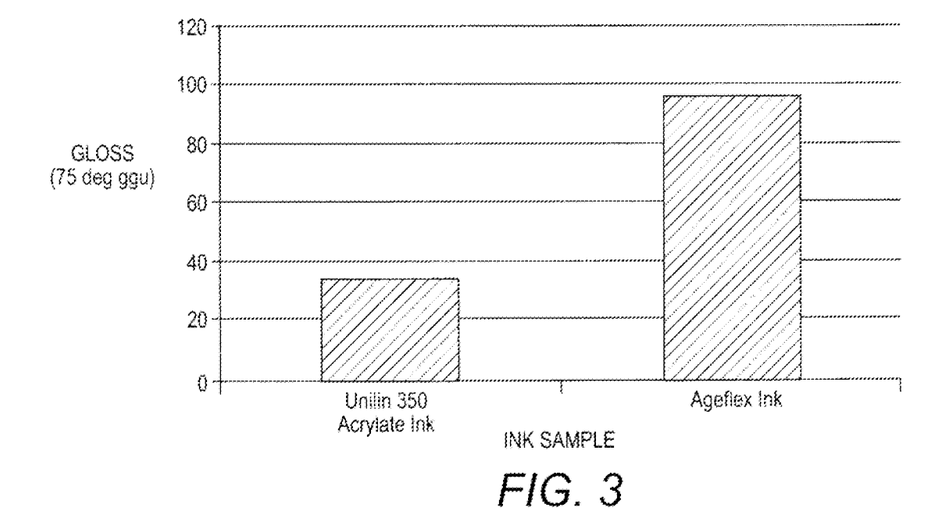
FIG. 3 is a graph illustrating 75° gloss values for test inks comprising the low melting curable acrylate wax as compared to those comprising the control high melting curable wax according to the present embodiments.

The inks of Table 1 were jetted at 85° C. directly onto an uncoated MYLAR substrate using a modified Xerox PHASER 8860 printer. The printed images were subsequently cured under UV illumination (Fusion UV, Hg lamp fitted with a D bulb) at/conveyor speed of 100 fpm. The resulting cured prints were then analyzed for glossiness by measuring 75° gloss with a BYK glossmeter. As can be seen from the graph illustrated in FIG. 3, the new ink formulation is substantially glossier than the current standard formulation. This difference is easily discernable by eye.

SUMMARY

In summary, the present embodiments provide for an ink formulation comprising a different curable acrylate having both a lower melting temperature and sharper melting transition. Inks comprising such formulation have been prepared and demonstrated to give prints having remarkably high and/or variable gloss as compared to standard UV curable phase-change inks printed in the same fashion.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A curable phase change ink comprising:
an ink vehicle further comprising a curable wax which comprises one or more acrylates having a formula of:

wherein n is less than 22 and has a melting point between 25 and 40° C.; and
an optional colorant, wherein a gloss value of printed areas of a substrate printed with the curable phase change ink is from about 80 to about 100 ggu when measured at 75°.

2. The curable phase change ink of claim 1, wherein the curable wax comprises a combination of from about 40 to about 55 weight percent of C18 acrylate, from about 0 to about 15 weight percent C20 acrylate and from about 35 to about 45 weight percent C22 acrylate.

3. The curable phase change ink of claim 1, wherein the curable wax is present in an amount of from about 15 percent to about 1 percent by weight of the total weight of the curable phase change ink.

4. The curable phase change ink of claim 3, wherein the curable wax is present in an amount of from about 10 percent to about 5 percent by weight of the total weight of the curable phase change ink.

5. The curable phase change ink of claim 1, wherein the curable wax has a melting point of from about 25 to about 35° C.

6. The curable phase change ink of claim 1, wherein the ink vehicle further comprises a gellant, a reactive diluent, and an initiator.

7. The curable phase change ink of claim 6, wherein the gellant is a compound of the formula wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, (ii) arylene groups, including substituted and unsubstituted arylene groups, and wherein heteroatoms either may or may not be present in the arylene group, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, and X and X' each, independently of the other, is an oxygen atom or a group of the formula $NR_4$, wherein $R_4$ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, (iii) an aryl group, including substituted and unsubstituted aryl groups, and wherein heteroatoms either may or may not be present in the aryl group, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group.

8. The curable phase change ink of claim 6, wherein the reactive diluent is a curable monomer or co-monomer selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, tricyclodecane dimethanol diacrylate, dioxane glycol diacrylate, butanediol diacrylate, and butyl acrylate, and mixtures thereof.

9. The curable phase change ink of claim 6, wherein the initiator is selected from the group consisting of benzophenones, benzophenone derivatives, benzyl ketones, α-alkoxy benzyl ketones, monomeric hydroxyl ketones, polymeric hydroxyl ketones, α-amino ketones, alkoxy ketones, acyl phosphine oxides, metallocenes, benzoin ethers, benzil ketals, α-hydroxyalkylphenones, α-aminoalkylphenones, acylphosphine photoinitiators and mixtures thereof.

10. The curable phase change ink of claim 1 having a viscosity of from about $10^4$ to about $10^{6.5}$ cPs at a temperature of from about 20° C. to about 30° C. and a viscosity of from about 5 to about 15 cps at a jetting temperature.

11. A curable phase change ink comprising:
a colorant; and
an ink vehicle further comprising a curable wax which comprises one or more acrylates having a formula of:

wherein n is less than 22 and has a melting point between 25 and 40° C., and further wherein when the curable phase change ink is printed and cured on a substrate and a gloss value of the printed areas of the substrate is from about 80 to about 100 ggu when measured at 75°.

12. The curable phase change ink of claim 11, wherein n is from 16 to 22.

13. The curable phase change ink of claim 11, wherein gloss of printed areas of the substrate exceeds gloss of unprinted areas of the substrate.

14. The curable phase change ink of claim 11, wherein the gloss of printed areas of the substrate is variable within the printed areas.

15. The curable phase change ink of claim 11 having a viscosity of from about $10^4$ to about $10^{6.5}$ cPs at a temperature of from about 20° C. to about 30° C. and a viscosity of from about 5 to about 15 cps at a jetting temperature.

16. A method for forming an image, said method comprising:
applying a low gloss curable phase change ink according to claim 1 and a high gloss curable phase change ink to a substrate in an imagewise manner to tune gloss within a print image; and
exposing the curable phase change inks to radiation to cure the inks to form the print image.

17. The method according to claim 16, wherein the curable phase change ink is applied to the substrate by ink jet printing.

18. The method according to claim 16, wherein the radiation is ultra-violet light.

19. The method according to claim 16, wherein the applying step comprises jetting the low gloss and high gloss curable phase change inks separately in halftone patterns or mixing the low gloss and high gloss curable phase change inks.

* * * * *